United States Patent

Sato

[11] Patent Number: 5,374,002
[45] Date of Patent: Dec. 20, 1994

[54] FISHING REEL

[75] Inventor: Jun Sato, Osaka, Japan

[73] Assignee: Shimano Inc., Osaka, Japan

[21] Appl. No.: 909,205

[22] Filed: Jul. 6, 1992

Related U.S. Application Data

[60] Division of Ser. No. 821,140, Jan. 16, 1992, Pat. No. 5,149,009, which is a continuation of Ser. No. 426,775, Oct. 26, 1989, abandoned.

[30] Foreign Application Priority Data

Oct. 31, 1988 [JP] Japan .................. 63-143116

[51] Int. Cl.⁵ .......................................... A01K 89/02
[52] U.S. Cl. ................................ 242/290; 242/306
[58] Field of Search .............. 242/264, 268, 246, 245, 242/290, 306

[56] References Cited

U.S. PATENT DOCUMENTS

| | | | |
|---|---|---|---|
| 2,209,598 | 7/1940 | Coxe | 242/268 |
| 2,334,244 | 11/1943 | Burdick | 242/290 |
| 2,485,741 | 10/1949 | King | 242/268 |
| 2,629,565 | 2/1953 | Schafer | 242/290 |
| 3,239,162 | 3/1966 | Henze | 242/268 |
| 3,549,103 | 12/1970 | Sarah | 242/290 |
| 3,612,425 | 10/1971 | Shakespeare | 242/268 |
| 4,513,925 | 4/1985 | Yamaguchi | 242/306 |
| 4,899,953 | 2/1990 | Toda | 242/268 |
| 5,149,009 | 9/1992 | Sato | 242/268 |
| 5,192,036 | 3/1993 | Sato | 242/268 |

Primary Examiner—Katherine Matecki
Attorney, Agent, or Firm—Dickstein, Shapiro & Morin

[57] ABSTRACT

A fishing reel capable of generating click sound with rotational operation of an adjustment member for applying resistance to a spool shaft in adjustment of casting or drag resistance. The reel includes a click spring retained within a spring receiver barrel and engageable with teeth formed in an inner peripheral face of the adjustment member for maintaining a rotational position of the adjustment member. The click spring has an approximately inverse letter 'V' shaped configuration including a top portion engageable with the teeth and a pair of leg portions extending respectively in opposite, outward directions from the top portion. The spring receiver barrel is attached to a reel body or to a handle shaft to be unrotatable relative thereto and has one axial open end to retain the spring therein. An anti-slipoff element is provided in the open end for preventing the click spring from slipping off the spring retainer opening. The click spring can be formed compact and economical and the spring receiver barrel is easy to mold.

6 Claims, 3 Drawing Sheets

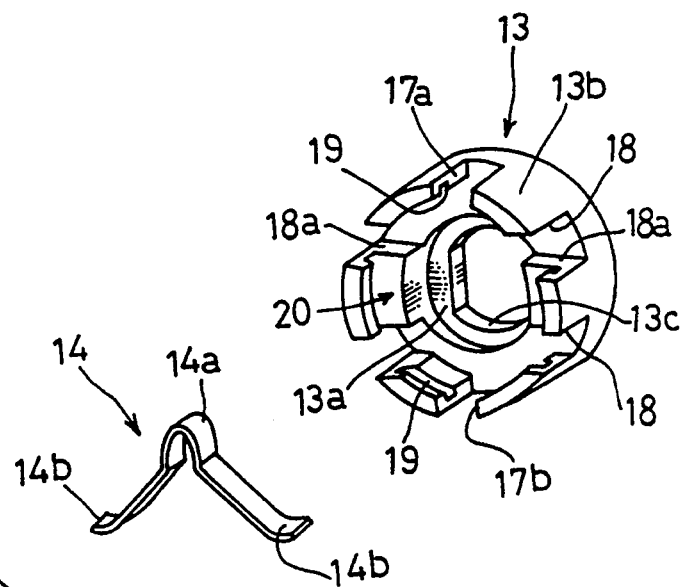
FIG. 2
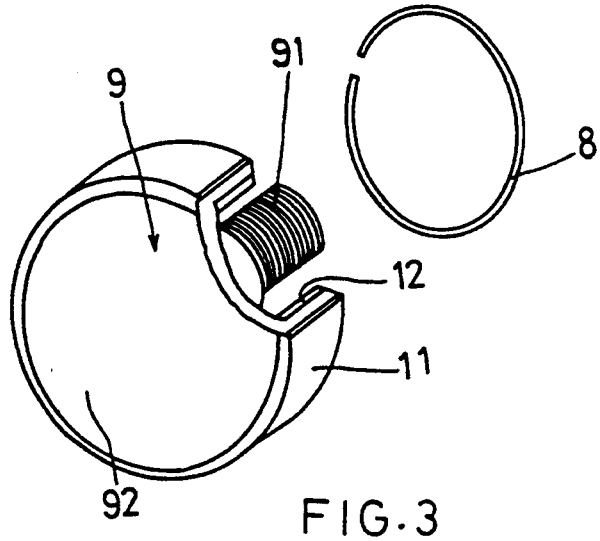
FIG. 3
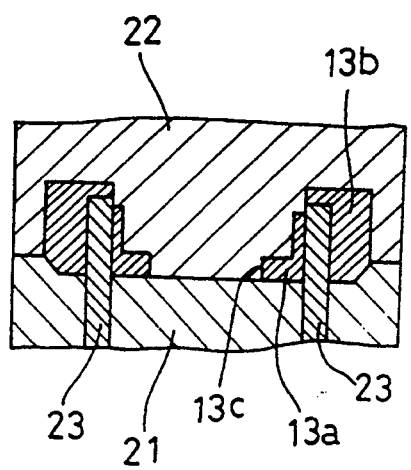
FIG. 4
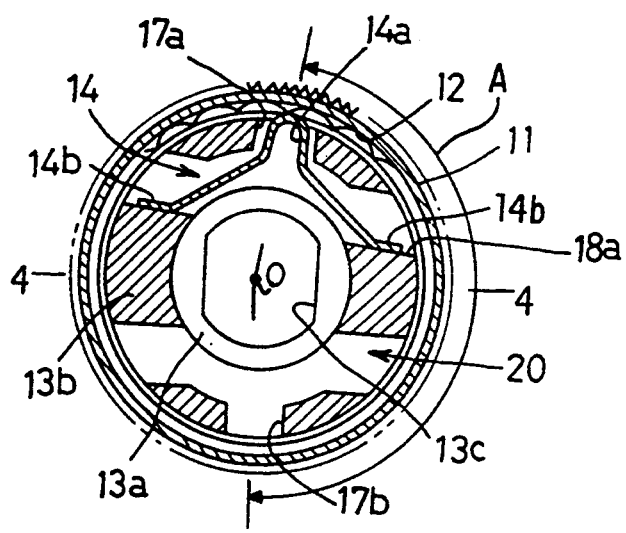

FISHING REEL

This application is a division of application Ser. No. 07/821,140 filed Jan. 16, 1992, U.S. Pat. No. 5,149,009, is a continuation of application Ser. No. 07/426,775 filed Oct. 26, 1989, now abandoned.

BACKGROUND OF THE INVENTION

1. Field of the Invention

The present invention relates to a fishing reel, and more particularly to a fishing reel capable of generating click sound by utilizing an adjustment member for applying resistance to rotation of a spool shaft.

2. Description of the Related Arts

A typical fishing reel of the above-noted kind is known from e.g. a Japanese laid-open utility model gazette No. 62-89981. This fishing reel includes a reel body which rotatably supports a spool shaft carrying a spool thereon, an adjustment member threaded with the reel body for applying resistance to rotation of the spool shaft by contacting one end face of the spool shaft. One of the adjustment member and the reel body mounts a clicking barrel defining a plurality of teeth in its inner peripheral face while the other integrally forms a spring receiver barrel which supports an approximately annular click spring. This click spring essentially consists of a letter inverse 'V' shaped top engaging portion engageable with the teeth, a pair of curved portions outwardly arcing respectively from opposed ends of the top engaging portion, and a pair of spring legs outwardly curving respectively from opposed ends of the curved portions.

In operation, with rotation of the adjustment member, the click spring elastically deforms to generate clicking sound and also to maintain the rotational position of the adjustment member.

In this conventional reel, however, the spring receiver barrel defines, in its peripheral face, a spring retainer cutout consisting of a receiver cutout for receiving the engaging portion of the click spring and stopper cutouts for stopping the opposed pair of spring legs. And, in molding the above spring receiver barrel, it has been very troublesome and costly to define the receiver cutout and the stopper cutouts in the mold.

In view of the above-described state of the art, the primary object of the present invention is to provide a simple and inexpensive fishing reel through rational improvement of its construction. Its spring receiver barrel defining a spring retainer opening is easy to mold and its click spring is small and inexpensive.

SUMMARY OF THE INVENTION

For accomplishing the above-noted object, according to the present invention, a fishing reel capable of generating a click sound for adjustment of casting resistance, comprises: a reel body rotatably supporting a spool shaft carrying a spool thereon at both ends of the spool shaft; and adjustment member for applying resistance to rotation of the spool shaft by contacting an end face of the spool shaft, the adjustment member including in an inner peripheral face thereof a clicking barrel peripherally defining a plurality of teeth; the adjustment member being threaded with said reel body; a click spring engageable with the teeth for generating clicking sound; and a spring receiver associated with the reel body for receiving the click spring; the click spring having an approximately inverse letter 'V' shaped configuration including a top portion engageable with the teeth and a pair of leg portions extending respectively in opposite, outward directions from the top portion; the spring receiver barrel defining at an axial end thereof a spring retainer opening for retaining the click spring, the spring retainer opening receiving therein anti-slipoff means for preventing the click spring from slipping off the spring retainer opening.

According to a further embodiment of the present invention, a fishing reel capable of generating click sound for adjustment of drag resistance, comprises: a reel body rotatably supporting a spool shaft carrying a spool thereon at both ends of the spool shaft; a handle shaft rotatable by a handle for rotating the spool shaft; a multi-plate type frictional braking mechanism for frictionally engaging a transmission gear with the handle shaft, the gear being fitted on the spool shaft and being meshed with a further gear slidable along an axis of the spool shaft; a friction adjusting member on which a star drag is threaded to be axially movable thereon; said friction adjusting member adjusting strength of frictional engagement of the multi-plate type frictional braking mechanism through an axial movement of the star drag; the star drag carrying a click barrel peripherally defining a plurality of teeth; a click spring engageable with the teeth for generating a click sound; and a spring receiver barrel for receiving the click spring, the spring receiver barrel being unrotatable relative to the handle shaft; the click spring having an approximately inverse letter 'V' shaped configuration including a top portion engageable with the teeth and a pair of leg portions extending respectively in opposite, outward directions from the top portion; the spring receiver barrel defining at an axial end thereof a spring retainer opening for retaining the click spring, the spring retainer opening receiving therein anti-slipoff means for preventing the click spring from slipping off the spring retainer opening.

With the above characterizing features of the present invention, similarly to the conventional construction, as the top engaging portion of the click spring comes into engagement with teeth defined in the inner peripheral face of the clicking barrel, the top engaging portion serves not only to generate a clicking sound but also to maintain a rotational position of the casting or drag adjustment member. In addition, since the spring retainer opening is comprised of the one opened axial end of the spring receiver barrel, this spring receiver barrel can be molded very easily.

Further, according to a still further embodiment of the present invention, the spring receiver barrel is constructed separately from the reel body or the handle shaft.

With this feature of the invention, the spring receiver barrel can be formed compact and even more easily.

According to a still further embodiment of the invention, said spring retainer opening peripherally defines a plurality of cutouts for receiving said top engaging portion of the click spring, with a phase angle between said cutouts being displaced for half a pitch of said teeth. This feature is advantageous for allowing fine adjustment of rotational stop position of the adjustment member when a plurality of click springs are used in the reel.

According to a still further embodiment of the present invention, said anti-slipoff means comprises a ring element to be fitted in an annular groove defined in the inner peripheral face of said spring receiver barrel. This feature is advantageous for facilitating manufature and assembly of the spring receiver barrel and consequently reducing manufacturing costs of the entire reel.

Further and other objects, features and effects of the invention will become apparent from the following more detailed description of the embodiments of the invention with reference to the accompanying drawings.

BRIEF DESCRIPTION OF THE DRAWINGS

FIG. 2 is a perspective view showing only major portions of the reel of FIG. 1,

FIG. 3 is a section view illustrative of an engaging condition between a click spring supported to a spring receiver barrel and a plurality of teeth, FIG. 4 is a schematic cross section taken along a line 4—4 of FIG. 3 and illustrating a molding method of the spring receiver barrel.

DESCRIPTION OF THE PREFERRED EMBODIMENTS

Preferred embodiments of the present invention will be particularly described hereinafter with reference to the accompanying drawings.

Figure 1:
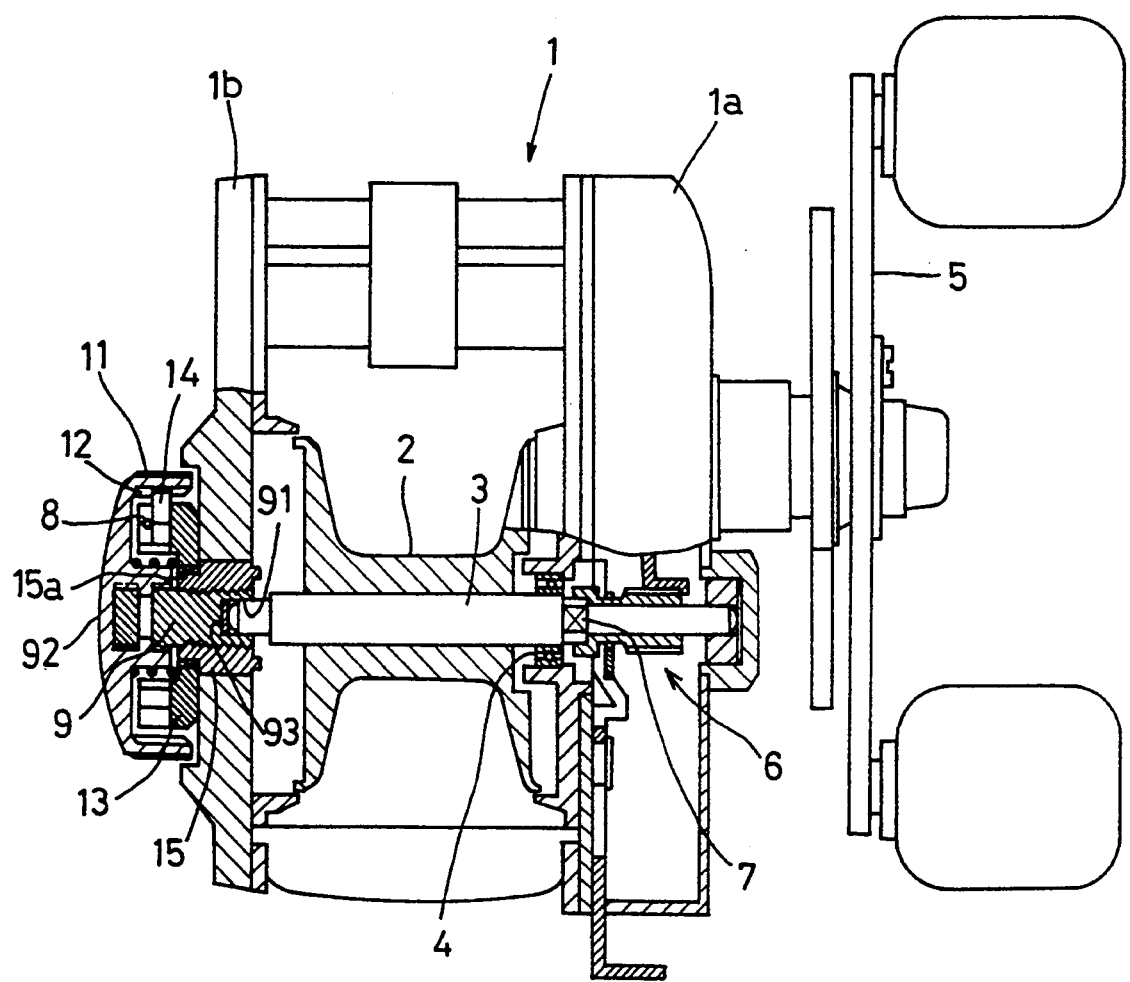
FIG. 1 is a partially cutout enlarged vertical section of a fishing reel according to one preferred embodiment of the present invention.

As shown in FIGS. 1 through 3, a fishing reel relating to the invention includes a reel body 1 with a pair of side frames 1a and 1b, a spool shaft 3 mounting thereon a spool 2 and rotatably supported between the side frames 1a and 1b. The one side frame 1a carries a bearing 4 and a drive mechanism 6 cooperative with a handle 5 rotatably supported to the side frame 1a. With manual rotation of this handle 5, the drive mechanism 6 is driven via a clutch 7 to wind up a fishing line about the spool shaft 3. The other side frame 1b defines in its outer periphery a threaded portion into which an adjustment member 9 is threaded. This adjustment member 9 includes, at one axial end thereof, a recess 91 for receiving one end of the spool shaft 3 and further includes, at the other axial end thereof, an adjustment knob 92. By being rotated, this adjustment member 9 applies resistance to the rotation of the spool shaft 3 through a spool receiver 93 consisting of a plate element made of metal such as phosphor bronze inserted in the recess 91.

The above reel further includes a clicking barrel 11 extending from an outer peripheral edge to the side frame 1b. This clicking barrel 11 defines a plurality of teeth 12 in an inner peripheral face thereof. Also, a spring receiver barrel 13 is fixed to an outer side of the side frame 1b and extends through interior of the clicking barrel 11 to receive a click spring 14 engageable with the teeth of the clicking barrel 11 for generating clicking sound. That is, with rotation of the adjustment member 9, the clicking spring 14 engages with the teeth to generate the clicking sound and also to maintain a rotational stop position of the adjustment member 9.

The click spring 14 is configured as an approximately letter 'V' shaped member consisting essentially of a top engaging portion 14a engageable with the teeth and a pair of leg portions extending respectively in opposite, outward directions from the top portion. The spring receiver barrel 13 and the reel body 1 are formed as separate entitles. The spring receiver barrel 13 defines at an axial end thereof a spring retainer opening 20 for retaining the click spring 14 and the spring retainer opening 20 receives therein anti-slipoff means for preventing the click spring 14 from slipping off the spring retainer opening 20.

More particularly, as illustrated in FIGS. 2 and 3, the click spring 14 is comprised of a bent plate member consisting of the center, top engaging portion 14a engageable with the teeth 12 and the pair of leg portions extending respectively in opposite, outward directions from the top portion. Free ends of the leg portions are slightly bent in opposite directions to form an opposed pair of contact portions 14b, 14b. On the other hand, the side frame 1b fixedly carries a support 15 centrally defining a threaded hole engageable with the adjustment member 9. The support 15 includes a projecting portion 15a which has a cross section with an opposed pair of semicircular sides and an opposed parallel pair of straight sides and projects outwardly from the side frame 1b. As shown in FIG. 2, the spring receiver barrel 13 includes a bottom wall 13a, a peripheral wall 13b and the spring retainer opening 20 which is defined at one axial end of the spring receiver barrel 13. The bottom wall 13a defines a stopper hole 13c having a configuration corresponding to the above-described cross section of the projecting portion 15a to receive the same therein. Accordingly, as the stopper hole 13c stops the projecting portion 15a therein, the spring receiver barrel 13 is unrotatably attached to the side frame 1b.

As best shown in FIG. 3, the peripheral wall 13b defines first and second cutouts 17a and 17b, each being large enough to permit free entry and exit of the engaging portion 14a of the click spring 14 into and out of the cutout 17a or 17b. These first and second cutouts 17a and 17b are approximately opposed to each other relative to an axial center O of the spring receiver barrel 13, with a phase angle displacement therebetween. More specifically, if one recess of the teeth 12 has a center angle of 15 degrees for example, an angle A formed by a center line of the first cutout 17a, the axial center O and by a center line of the second cutout 17b, is set 7.5 degrees smaller than 180 degrees, i.e. 172.5 degrees in this particular case. The peripheral wall 13a further defines two pairs of further cutouts 18, 18 peripherally across the first and second cutouts 17a and 17b respectively. These cutouts 18, 18 form contact faces 18a, 18a which come into contact with the contact portions 14b, 14b of the click spring 14. Also, the peripheral wall 13a defines, by cutting of its inner peripheral face, an intermittent groove 19 intermitted by the peripheral openings formed by the cutouts 17a, 17b and 18, 18. Accordingly, in assembly, the click spring 14 is held in the spring retainer opening 20 and then a ring 8 is fitted into the groove 19, such that the ring 8 and the groove 19 act together as the anti-slipoff means for prevening the click spring 14 from slipping off the spring retainer opening 20.

As described above, as the engaging portion 14a of the click spring 14 comes into engagement with the teeth 12 defined in the inner peripheral face of the clicking barrel 11, this engagement serves not only to generate clicking sound with rotation of the adjustment member 9 and but to maintain a rotational stop position of this adjustment member 9. Moreover, since the spring receiver barrel 13 is formed separately from the side frame 1b and also its spring retainer opening 20 is formed by the one opened axial end of the barrel 13, this spring receiver barrel 13 can be molded very easily. On the other hand, the contact faces 18a, 18a contacting the contact portions 14b, 14b of the click spring 14 are provided respectively on the opposed sides across the first and second cutouts 17a and 17b which receive the engaging portion 14a of the click spring 14. The engaging portion 14a moves in and out through cutout portion 17a in a first direction generally along a radius of the spring receiver barrel 13, and the contact faces 18a, 18a are oriented substantially normal to the direction of movement of the spring engaging portion 14a. With this arrangement, the click spring 14 need not surround the adjustment member 9, and consequently, the arrangement serves to form a small click spring 14, and is hence economical.

In the foregoing embodiment, the first and second cutouts 17a and 17b defined in the peripheral wall 13b are approximately opposed to each other relative to the axial center of the spring receiver barrel 13, with the phase angle displacement therebetween corresponding to half a pitch of the teeth 12. Then, though not shown, utilizing this positional arrangement, if two click springs 14 instead of one are employed, finer pitch adjustment becomes possible in maintaining the rotational stop position of the adjustment member 9, and the clicking sound will be generated by half the interval of the single-spring construction of the foregoing embodiment. Moreover, in case the adjustment member 9 has an odd number of teeth, the same effect will be achieved if the two click springs 14 are set in symmetric arrangement.

In the foregoing embodiment, the groove 19 is defined by means of cutting in the inner peripheral face of the peripheral wall 13b. Alternately, in case the spring receiver barrel 13 is formed e.g. by using molds 21 and 22 as schematically illustrated in FIG. 4, an inserting mold 23 is inserted from the bottom of the spring receiver barrel 13. With this, the groove 13 can be formed simultaneously with the molding of the spring receiver barrel 13, thereby further facilitating the manufacture of the spring receiver barrel 13.

Further alternately, it is conceivable to enlarge the width of the ring 8 in the axial direction of the drag adjustment member 9 so that one end of this ring 8 can contact a back face of the adjustment member 9 for preventing slipoff of the click spring 14. In this case, the groove 19, which constitute the anti-slipoff means together with the ring 8 in the foregoing embodiment, can be totally eliminated.

A still further embodiment of the present invention will be described next with reference to FIG. 5.

Figure 5:
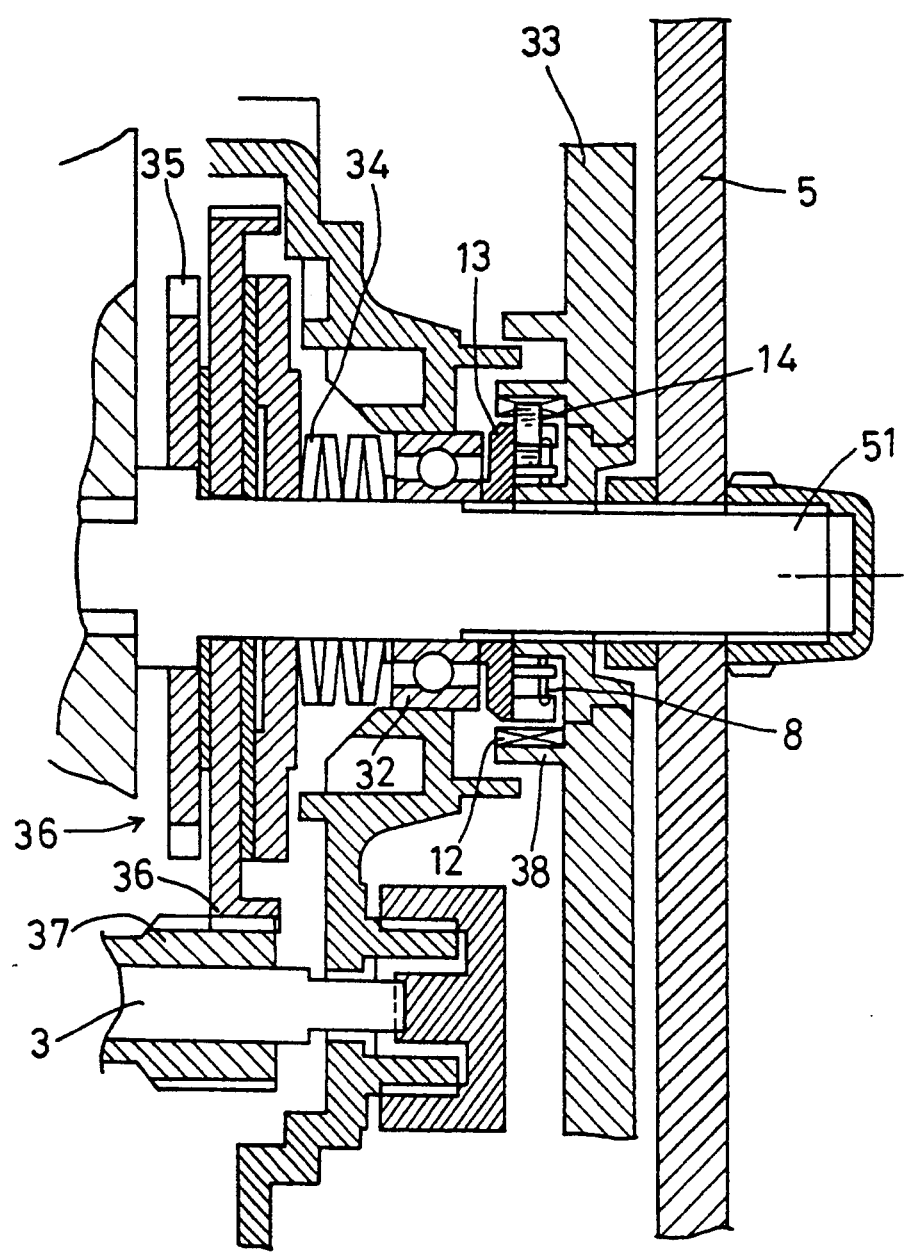
FIG. 5 is a partially cutout view illustrating a fishing reel relating to a further embodiment of the present invention.

FIG. 5 is a partially cross sectional view of a fishing reel of this embodiment capable of generating a clicking sound in drag resistance adjustment. In this fishing reel, a handle shaft 51 mounts a handle 5, (not shown) a multi-plate friction brake mechanism 31 and a friction adjusting member. The handle 5 is mounted on the handle shaft 51 through screwing engagement.

The multi-plate friction brake mechanism 31 includes a ratchet wheel 35, a gear 36 meshing with a gear 37 fitted on the spool shaft 3 and an axially aligned group of friction plates interposed between pressure plates.

By appropriately setting frictional force of the multi-plate friction brake mechanism 31, when there is a particularly strong pull from a caught fish, the gear 36 slides inside the brake mechanism 31 and becomes rotatable relative to the handle shaft 51. Accordingly, the spool shaft 3 is rotatable in connection with the pulling force, such that the reel can feed the fishing line while winding up the same.

The ratchet wheel 35 is fixed on the handle shaft 51 at an end opposed to the handle of the brake mechanism 31, and the wheel 35 is engageable with an unillustrated claw attached to the reel body 1 for allowing rotation of the handle shaft 51 only in one direction. The pressure plates are fitted on the handle shaft 51 so as not to be rotatable relative thereto.

The friction adjusting member includes a star drag wheel 33 engaged on a thread of the handle shaft 51 to be axially movable thereon with relative rotation therewith, a bearing 32 rotatably supporting the handle shaft 51 and an adjustment spring 34 for adjusting pressurized frictional force of the multi-plate friction brake mechanism 31.

In operation, as the star drag wheel 33 moves towards the reel body 1, the adjustment spring 34 is compressed through its end abutment against an inner ring portion of the bearing 32 thereby to press the pressure plates for increasing the frictional force of the multi-plate type friction brake mechanism 31.

Then, in the above construction of this embodiment, the spring receiver barrel 13 for receiving the click spring 14 as employed in the first-described embodiment is interposed between the star drag wheel 33 and the bearing 32.

The handle shaft 51 has its two peripheral portions chamfered, such that at this portion the shaft 51 has a cross section with an opposed pair of semicircular sides and an opposed parallel pair of straight sides so as to be engaged into a hole defined in the axial center of the spring receiver barrel 13. Through this engagement, the spring receiver barrel 13 is unrotatable while being axially movable relative to the handle shaft 51. The star drag wheel 33 carries a click barrel 38 defining a plurality of teeth 12 in its inner periphery. The teeth 12 are engageable with the click spring 14. Accordingly, as the star drag wheel 33 is rotated relative to the handle shaft 51 for adjustment of frictional force, the above engagement between the teeth 12 and the spring 14 creates clicking sound.

As in the foregoing embodiment, the click spring 14 has an approximately inverse letter 'V' shaped configuration consisting of the top engaging portion 14a engageable with the teeth 12 and the pair of leg portions extending respectively in opposite, outward directions from the top portion 14a. The spring receiver barrel 13 defines at an axial end thereof the spring retainer opening 20 for retaining the click spring 14, and the spring retainer opening 20 receives, in its peripheral groove formed adjacent the opened end of the spring retainer opening 20, the metal ring 8 as the anti-slipoff means for preventing the click spring 14 from slipping off the spring retainer opening 20.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A fishing reel comprising:
   a reel body rotatably supporting opposed ends of a spool shaft carrying a spool thereon;
   an adjustment member for applying resistance to rotation of said spool shaft, said adjustment member being in threaded engagement with said reel body;

a clicking barrel defined in an inner peripheral face of said adjustment member and defining a plurality of teeth;

at least one click spring having an approximately inverse letter 'V' shaped configuration, said click spring including an engaging portion and a pair of leg portions extending away from said engaging portion in opposite, outward directions, said click spring generating a click sound through engagement between said engaging portion and said teeth, said click spring having a rectangular cross section;

a spring receiver barrel non-rotatably connected to said reel body, said spring receiver barrel defining at an axial end thereof a spring retainer opening for retaining said click spring;

said spring retainer opening having a peripheral wall which forms at said axial end a first cutout portion for allowing said engaging portion of said click spring to move in and out along a first direction generally along a radius of said spring receiver barrel, and second cutout portions, said second cutout portions comprising a pair of contact faces extending substantially normal to said first direction, said leg portions of said click spring being in contact with said faces of said second cutout portions; and anti-slipoff means for preventing said click spring from slipping out of said spring retainer opening.

2. A fishing reel as defined in claim 1, wherein said spring receiver barrel and said reel body are separate entities.

3. A fishing reel as defined in claim 1, wherein said spring retainer defines a plurality of said first cutouts for receiving said engaging portion of said click spring, wherein said plurality of first cutouts are arranged such that when one of said first cutouts is aligned with one of said plurality of teeth of said clicking barrel, another of said first cutouts is between two of said plurality of teeth.

4. A fishing reel as defined in claim 3, wherein one of said first cutouts is displaced from another of said first cutouts by 180° minus one-half of a pitch of said teeth.

5. A fishing reel as defined in claim 1, wherein said anti-slipoff means comprises a ring element fitted in an annular groove defined in the inner peripheral face of said spring receiver barrel.

6. A fishing reel as defined in claim 1, wherein said spring receiver barrel comprises a first half portion and a second half portion, and said click spring is contained wholly within said first half portion.

* * * * *